Patented Nov. 22, 1932

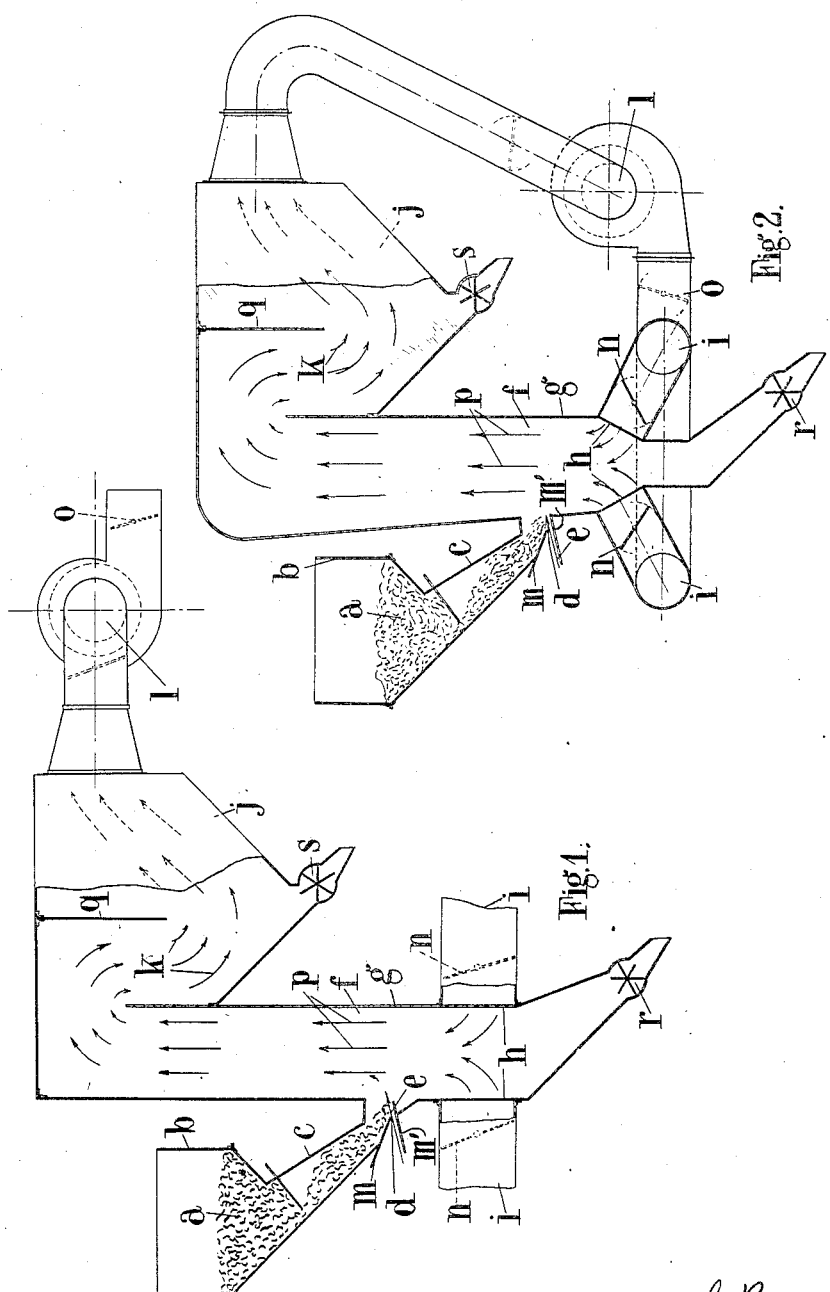

1,888,372

UNITED STATES PATENT OFFICE

IVOR LLOYD BRAMWELL, OF BIRTLEY, ENGLAND, ASSIGNOR OF ONE-HALF TO THE BIRTLEY IRON COMPANY LIMITED, OF BIRTLEY, ENGLAND

SEPARATION OF DRY MATERIALS

Application filed February 13, 1930, Serial No. 428,200, and in Great Britain August 6, 1929.

This invention relates to the separation of dry materials particularly the separation of the larger and smaller particles of a mass of divided material such as a mixture of coal of different sizes.

The object of the invention is to provide an improved apparatus and process for the separation of the smaller and larger particles from a mass of divided material; also for collection of the smaller particles of one or more stages and for the automatic feed of the intermixed divided material to the apparatus and for the automatic discharge of the separated material from the apparatus.

The invention consists in a process and apparatus for the purposes referred to above in which the mixture of materials lying in a hopper is wholly or in part caused to travel therefrom by means of an air or like current which may or may not be part of a main air current for effecting separation the larger particles falling downwards under the action of gravity against the above two air currents and a further separation being effected by causing the air current to flow in a downward direction to enable coarse dust or the like to be separated, after which the fine dust or the like is removed from the air for instance, in or by means of a filter preferably combined with a vane.

The invention also consists in a process and apparatus according to the preceding paragraph operated under closed cycle conditions.

The invention also consists in a process or apparatus according to either of the preceding two paragraphs substantially as herein described.

The accompanying diagrammatic drawing illustrates two methods of carrying the invention into effect.

Figure 1 deals with an open cycle system, and

Figure 2 with a closed cycle system.

In carrying the invention into effect in the form illustrated by way of example in Figure 1, divided material of mixed sizes $a$ is fed from a hopper $b$ and allowed to fall by gravity down an inclined chute $c$.

At the lower end of this chute a narrow, rectangular slot $d$ whose vertical height is small compared with its horizontal dimension is provided. This slot extends the full width of the chute $c$. Through the rectangular aperture $d$ a jet of air indicated by $e$ is sucked into the bottom of the apparatus. This air jet causes the divided material $a$ at the bottom of the chute $c$ to be spread out in curtain form across the main chamber $f$ of the apparatus.

This main chamber consists of vertical chimney or flue $g$ of uniform cross sectional area together with the other parts referred to below.

The flue $g$ extends for some distance both above and below the slot $d$. The vertical walls of the flue $g$ are provided with openings $h$ for the admission of air from the atmosphere at the openings $i$.

The openings $h$ in the wall $g$ are situated below the slot $d$. The top of the flue $g$ opens into a chamber $j$ which is of much greater cross sectional area than the flue $g$.

In this chamber $j$ the air first flows in a downward direction as illustrated by the arrows $k$. This chamber $j$ has for its purpose the collection of the extracted fine particles, that is, the fine particles extracted from the mixture $a$ and may be called the settling chamber.

Connected with this settling chamber $j$ is an exhauster or suction fan $l$ the purpose of which is to create a condition of partial vacuum inside the flue $g$ and the settling chamber $j$ whereby the jet of air $e$ drawn in through the rectangular slot $d$ derives the necessary energy for the functions which it has to perform.

Suitable means are provided for adjusting the size of the air jet slot $d$, for example, a sliding plate $m$ may be used for this purpose.

Means are also provided for adjusting the air from the inlet openings $h$, for instance, butterfly valves $n$ may be used.

The discharge orifice $o$ from the fan $l$ may be connected with a filter for the purpose of recovering the finest dust from the escaping air.

The air which is admitted at the lower part of the main flue $g$, namely through the openings $h$ and $i$ passes up through the flue $g$ as indicated by the arrows $p$ at a substantially uniform velocity of predetermined magnitude and crosses the curtain of material $a$ which is projected across the flue $g$ by means of the air jet or current $e$, entering the rectangular slot $d$ at the level of the bottom of the chute $c$ and causes particles below the predetermined size to be separated from the mixed material $a$ and carried in the air stream $p$ up the flue $g$ and into the settling chamber $j$.

The cross sectional area of the settling chamber $j$ being much greater than that of the flue $g$ there is a substantial reduction in the velocity of the air passing through it, and this causes the fine particles to settle.

Suitable deflectors or baffles $q$ are provided in the settling chamber $j$ to accelerate such settling action and to ensure the air initially flowing in this chamber to flow in a downward direction.

For the purpose of regulating the pressure condition within the apparatus the openings $h$ may be covered with an air resisting material, for instance, perforated metal sheet, wire mesh cloth or the like.

For the discharge of the separated products balanced doors, mechanical valves or the like may be provided, one, namely $r$ being situated at the lowest extremity of the main flue $g$, and another, namely $s$, at the bottom of the settling chamber $j$ substantially at the end of the downward flow of the air. The discharge doors may be of a type balanced by levers and weights or springs or by any other suitable method for the purpose of retaining them in a closed position until sufficient material is collected on their upper surfaces to overcome the balance weight or the like and thereby discharge the material by gravity without the admission of air to the apparatus, or alternatively without the escape of air therefrom.

The volume of air passing up the main flue may, if desired, be controlled by valves provided at the inlet and discharge points to the fan.

The chute at the feed point of the apparatus may provide an automatic feed control to the apparatus. The lower part of this chute is preferably constructed in a manner so that when no air is passing through the jet aperture at this point the material is retained in the chute at its repose angle, but when air is sucked through the jet the energy of the air stream displaces the material at the lowest point of the pile and projects it into the apparatus thereby automatically starting the feed of the raw material to the apparatus.

The angle of the coal $a$ or the like in the chute $c$ is steeper than the angle of repose, and especially is this the fact with the free surface of the coal between the bottom of the chute $c$ and the plate forming the lower edge of the supplemental air slot $d$. The coal therefore, apart from this aforesaid plate, would fall under the action of gravity. The aforesaid plate is at such an angle to prevent this, but the angle is such that when air is admitted through the slot $d$, this bottom plate is no longer able to stop the flow. It is not a matter of forcing the coal into the main stream or chamber $f$ by the auxiliary air, but the auxiliary air modifies the condition of the coal, making it more of the nature of a fluid, so that the angle which was in respect of the coal in its natural or non-fluid condition less than the angle of repose now in the fluid state of the coal becomes greater than the angle of repose.

Thus the raw material to be separated is fed into a hopper $a$, from whence it passes down a chute $c$ terminated at its lower end in an arrangement of plates $m$ and $m'$ which constitute an adjustable slot through which air may be introduced into the apparatus.

The chute $c$ and plates $m$ and $m'$ are so constructed that the material to be treated is retained on the plate $m'$ at its normal angle of rest.

On starting up the fan $l$, a pressure lower than atmospheric is obtained in the main flue $g$, and this exerts an effort on the material lying immediately in front of the rectangular slot $d$.

Under apparently the combined effect of the difference in pressure above and below the material immediately in front of the slot $d$, and of the lubricating effect of the air which filters in between the particles, the frictional resistance between the particles themselves and between the particles and the plate $m'$ is decreased to such an extent that the effort exerted by the material in the chute $c$ is sufficient to overcome the frictional resistance of the particles immediately in front of the jet, and in consequence, these particles are fed into the main flue $g$.

They are replaced by further particles falling down the chute $c$ which are in turn fed into the main flue $g$ in similar manner, a continuous control feed being thereby maintained.

The means provided for adjusting the air inlet openings in the main flue, also for adjusting the opening of the jet slot permit of the control of velocity of the air current which passes upwardly through the main flue to that desired for the particular size of particle to be removed.

In the alternative form of the invention illustrated in Figure 2 a closed cycle system is shown in which the exit $o$ from the fan $l$ is connected to the air openings $i$ of the main flue $g$ so that the air exhausted by the fan is returned to the apparatus and the air flow becomes that of a closed cycle. In such modified form it is preferred that balanced valves be provided so that any accidental leakage into or out of the closed cycle may be automatically compensated for and the necessary velocity through the main flue thereby maintained.

*General*

The above examples are given by way of illustration only and modification may be made if desired.

The cross section of the main chimney or flue may be rectangular, the major axis being parallel to the slot, and in an alternative form the flue may be so constructed as to converge downwardly below the slot.

The upper part of the flue *g* may be slightly expanded above the slot.

The main flue may be somewhat tapered expanding from the bottom towards the top. In the case of a flue of square or rectangular section the taper may be made on one side or on both sides. In the case where the taper is made on one side, it is preferred to make it on the side adjacent to the feed hopper.

The object of the tapering of the main flue is to reduce velocity and assist in the separation of the main particles.

In the closed cycle construction, and also in an open cycle construction for the purpose of controlling feeding, especially with damp coal or where there is a liability to choke, automatic means may be provided to enable an extra suction to be applied to the feeding orifice, or an extra pressure may be applied at that place to assist in overcoming or clearing any obstruction. This may be effected by causing the coal to fall on to balanced doors or the like and utilizing the pressure or the movement thus obtained to operate air valves or the like.

Having now described my invention, what I claim as new and desire to secure by Letters Patent is:—

1. In an apparatus for the separation of dry materials, a main flue having a depending portion formed thereon with an air inlet, suction means for causing a main air material-bearing current to flow upwardly through said flue, said flue including an opening above the depending portion, a feeding device including a plate at the bottom of the opening extending outward in a substantial horizontal plane, a feed hopper having a bottom plate spaced above the first plate and forming therewith an air jet orifice, the material to be separated lying substantially at rest against the action of gravity on the first mentioned plate and the feed of such material being effected by the disturbance caused by the action of air flowing inwardly through said orifice.

2. An apparatus as claimed in claim 1, characterized by the provision of regulating means connected with the first mentioned air inlet to regulate the strength of the current passing through the main flue.

3. In an apparatus for the separation of dry materials, a main flue having a combined material feeding and air inlet orifice therein, relatively adjustable plates located in said orifice adapted to vary the area of the latter for controlling the amount of material fed into the main flue, one of said plates constituting the bottom of a fed hopper, means for inducing a flow of air through the main flue, means for regulating the admission of air to the lower part of the main flue, a secondary supply of air being admitted to the flue through the orifice therein and the material to be separated lying substantially at rest against the action of gravity on said plates and the feed of said material being effected by the disturbance caused by the action of air flowing inwardly through said orifice.

In testimony whereof I have signed my name to this specification.

IVOR LLOYD BRAMWELL.